Aug. 14, 1945.　　K. E. SIHVONEN ET AL　　2,382,673

BALANCING MACHINE

Filed Nov. 30, 1942　　2 Sheets-Sheet 1

Inventors
Kauno E. Sihvonen &
Earl F. Riopelle

Attorneys

Aug. 14, 1945.   K. E. SIHVONEN ET AL   2,382,673
BALANCING MACHINE
Filed Nov. 30, 1942   2 Sheets-Sheet 2
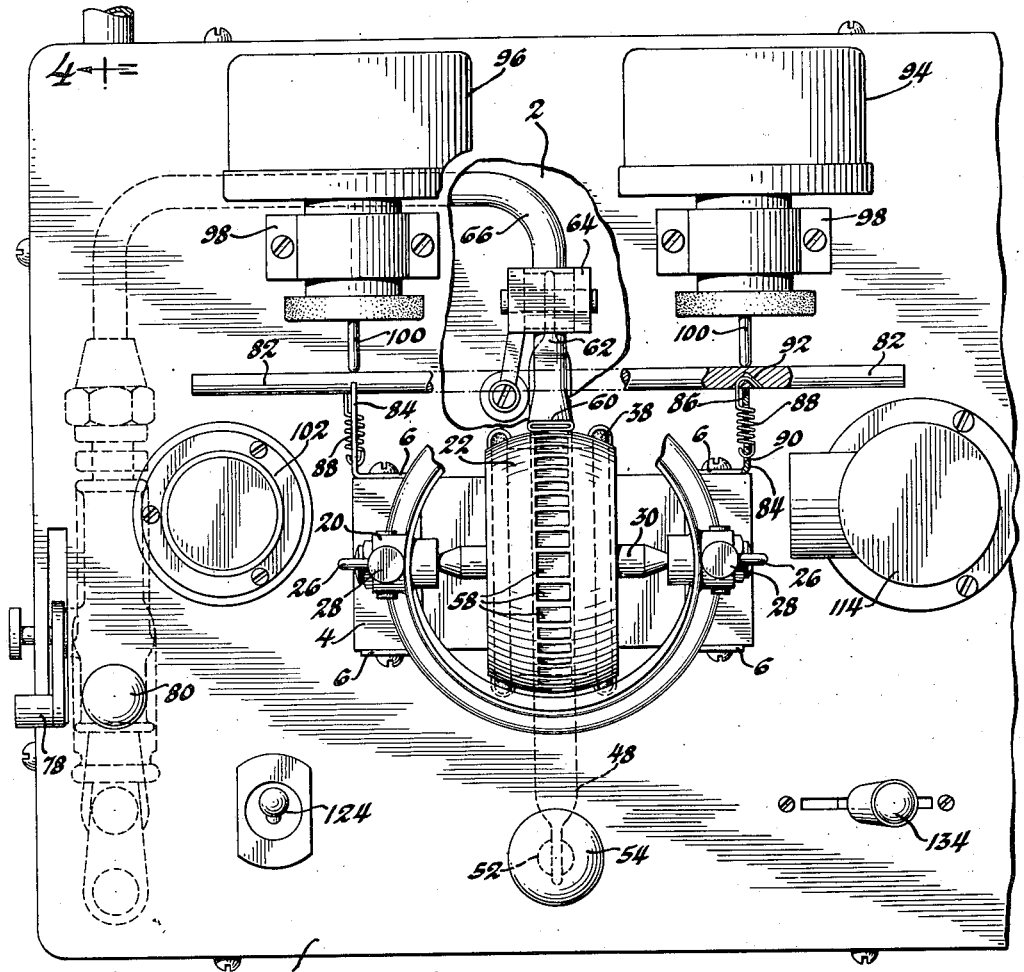
Fig. 3
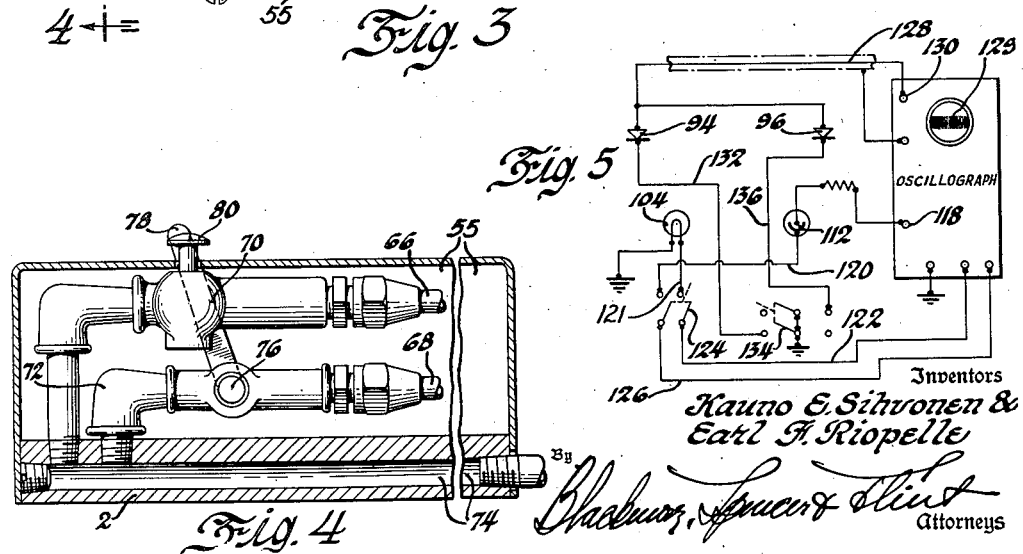
Fig. 4
Fig. 5
Inventors
Kauno E. Sihvonen &
Earl F. Riopelle
Attorneys Patented Aug. 14, 1945

2,382,673

UNITED STATES PATENT OFFICE 2,382,673

BALANCING MACHINE

Kauno E. Sihvonen and Earl F. Riopelle, Detroit, Mich., assignors to General Motors Corporation, Detroit, Mich., a corporation of Delaware Application November 30, 1942, Serial No. 467,434

9 Claims. (Cl. 73—66)

This invention relates to balancing means and more specifically to means for dynamically balancing a rotating part at substantially the speed at which it will normally operate in service. Dynamic forces applied to a rotating body occasion various vibrations which cannot be anticipated by statically balancing the device and it is therefore necessary in many instances and especially where the rotative speed is high to carefully balance bodies dynamically so that they may operate satisfactorily and not be subject to vibrations set up by dynamic forces therein.

It is therefore an object of our invention to provide a means for dynamically balancing a rotating part.

It is a further object of our invention to provide balancing means which is easily operated and quickly determines the amount and angular location of the unbalanced force.

It is a still further object of our invention to provide a balancing machine for rotative parts which is simple and rugged in construction.

With these and other objects in view which will become apparent as the specification proceeds, the embodiments of our invention will be best understood by reference to the following specification and claims and the illustrations in the accompanying drawings in which:

Figure 3 is a top plan view of our balancing machine;

Figure 4 is a sectional view taken on line 4—4 of Figure 3; and

Figure 5 is a wiring diagram illustrating the connection of the various parts of our machine in an electrical indicating circuit.

Figure 1:
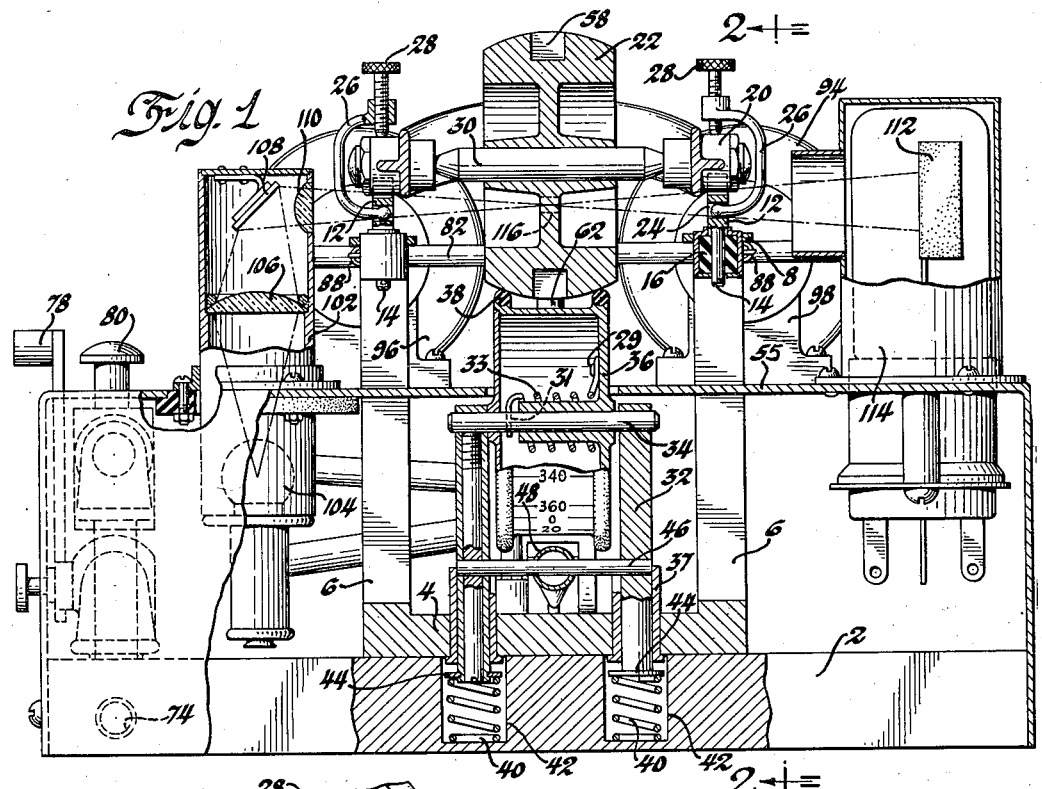
Figure 1 is a vertical section through a balancing machine embodying our invention.
Figure 2:
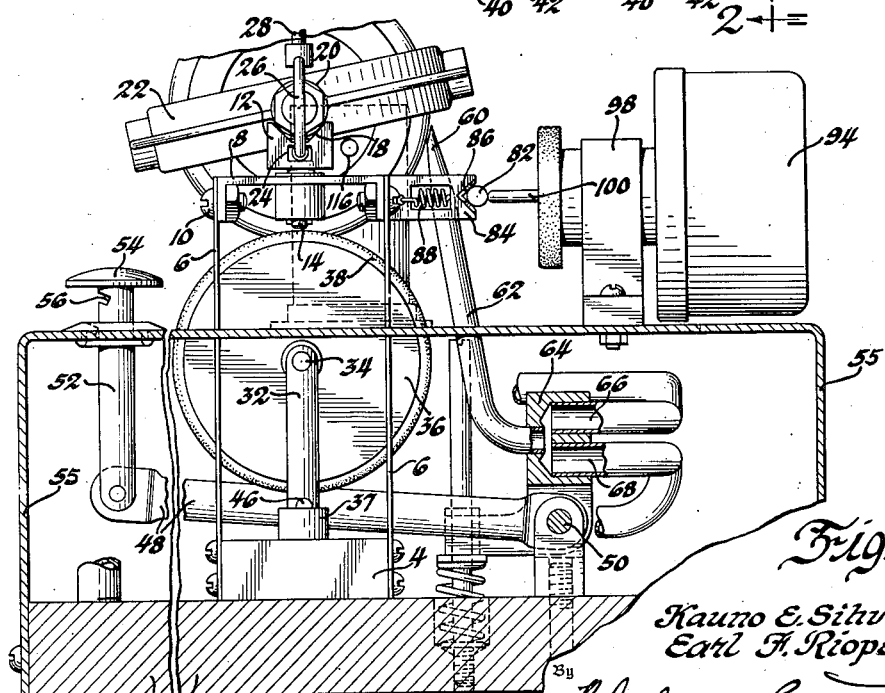
Figure 2 is a sectional view taken on line 2—2 of Figure 1.

Referring now more specifically to the drawings, in Figure 1 there is disclosed a base member 2 upon which is rigidly mounted a rectangular block 4. Each of the corners of this block support a vertical leaf spring member 6. The upper ends of each pair of spring support members are secured to a cross member 8 by suitable bolts 10 and mounted upon the cross member 8 and in the center thereof is a pivoted bearing member 12, the shaft 14 of which projects down into a rubber bushing 16 carried by the member 8. The upper surface of the bearing member 12 is cut to form a V notch 18 into which one of the gimbals 20 of a gyro-rotor 22 may be clamped. The bearing member 12 is also provided with an opening 24 which pivotally carries one end of a C clamp 26, the opposite end of the C clamp being provided with a thumb screw 28, the point of which is forced down against the upper surface of the gimbal 20 to lock the same in position. The opposite gimbal 20 of the gyro-rotor 22 is clamped in similar means in the pivoted bearing support 12 of the opposite side. The gyro-rotor is therefore free to rotate about its axis 30.

Carried between the spring members 6 are a pair of spaced uprights 32 which non-rotatably support a horizontal pin 34 upon which is mounted a rotatable protractor drum 36 having a scale of zero to 360 on its outer face. A coil spring 33 is mounted within the drum and concentric with the pin 34 one end of which is secured through a hole 31 in the pin and the opposite end by a screw or rivet 29 to the drum. This tends to locate the drum at a given angular position with respect to the pin but allows the same to rotate thereon by tensioning the spring which will bring it back to its initial position when released. The drum is also provided with two circular rubber rings 38 which are adapted to engage the surface of the rotating gyro and cause the two to rotate together under certain circumstances. The two uprights 32 are vertically slidably mounted in two sleeves 37 rigidly mounted in the block 4, the lower ends of the uprights projecting into recesses 42 in the base 2 and having secured to the ends thereof disc washers 44. Compression springs 40 are provided within the recesses 42 and press against the disc washers 44 and the base of the recesses to bias the drum assembly upward. Thus these springs tend to eject the supports 32 and force the protractor assembly to its upper position.

A second cross pin 46 extends through and between the members 32 below the rotatable protractor and also diametrically through a hollow central operating pipe 48 which is pivoted to the frame at 50. A vertical plunger 52 is pivoted to the opposite end of the pipe 48 and extends above a casing 55 applied over the base and enclosing a portion of the apparatus. Upon the top of the plunger 52 is a flat button 54 which may be manually depressed. There is also provided an angular slot 56 adapted to engage with the side of the cover to lock the plunger 52 in its lowermost position. Thus as the plunger 52 is depressed it pulls the protractor wheel down out of engagement with the rotor but if the same is unlocked and allowed to rise due to pressure on the springs 40, the rubber rings on each of the opposite edges of the protractor drum will engage the surface of the gyro-rotor and rotate with the same. The purpose of this is to locate an angular index point and this will be more clearly described later.

To rotate the rotor compressed air is used as there are provided on the outer surface of the rotor a series of depressions 58 which act as pockets for the air which is directed against them by a nozzle member 60. This nozzle is merely the end of a tube 62 which has this portion drawn together to provide a narrow outlet, said tube being mounted in a connecting block 64. Into this block are also introduced two tubes 66 and 68, the lower tube being connected directly to a metering valve 76 and thence through line 72 to any suitable air intake 74. The other line 66 is connected to a spring biased bypass valve 76 and thence again to the air supply 74. The bypass valve is operated by button 80 and the metering valve by a lever 78. These two valves are provided for purposes of bringing the rotor up to its maximum speed quickly, and then maintaining it at a definite speed. The bypass valve operated by button 80 is that used to quickly bring the rotor up to speed and this merely applies full air pressure to the nozzle 60 when the button is depressed. After the rotor has reached substantially its predetermined rate, the operator releases the button 80 to close the same and instead moves the lever 78, the metering valve operated thereby having been adjusted to allow only a predetermined amount of air therethrough which maintains the rotor at its rated speed.

In order to ascertain the amount of vibration caused by the rotation of the rotor, at its rated speed, there is provided what is known as a nodal bar 82 which extends the full length of the rotor and to one side thereof. This bar acts as an intermediary or transfer bar for transferring vibrations from a rotating shaft to sensitive pickup means. The general theory in construction of nodal bars forms no part of the present invention but is fully described in a patent issued to T. C. Van Degrift, entitled "Balancing machine," No. 2,293,371, dated August 18, 1942. As described therein, nodal points for testing a particular part may be located and thereafter parts of similar configuration balanced by having the pickup means located at the previously located points. Thus, pickup units 94 and 96 have been located for this rotor. If another type of rotor were to be tested, the positions of these units might have to be changed. Bent outwardly from the upper end of the rear two of the springs 6 is an angular bracket portion 84 whose outward end has a V notch 86 therein which is adapted to engage the nodal bar 82, the nodal bar being maintained in the V-shaped section by a tension spring 88, one end of which is fixed into a hole in the bracket as at 90 and the opposite end of which is hooked into a groove 92 in the nodal bar. Thus the nodal bar is maintained against the V notches in the two spaced brackets 84 under all conditions and there is applied to this nodal bar any horizontal vibration transmitted to the cross members 8 by vibration of the opposite ends of the rotor.

Secured to the upper surface of the cover 55 are the two spaced pick-up units 94 and 96 which are supported on brackets 98. These pick-up units are units in which a voltage is generated as the pressure thereupon is altered, such as, for example, quartz crystals. The alteration in pressure on these pick-up units is provided by a movable pressure rod 100 which extends into the unit and presses against the crystal or other material and has its opposite end brought into contact with the nodal bar 82 opposite to its point of contact with the brackets 84. Thus as the nodal bar is varied in position due to vibration of the rotor supports caused by unbalance of the rotor, the voltage generated in the pick-up units will vary, depending upon the position of the rods 100. This voltage is applied to an oscillograph to obtain an indication of the amplitude of unbalance in a manner to be described more in detail at a later point.

In order to obtain the angular position of the unbalance as well as the amplitude thereof, it is also necessary to provide some means for indicating a particular angular position on the rotating body at a definite time. In the present instance this indexing position is obtained by the following mechanism. To the cover 55 is supported a cylindrical member 102 in one end of which is located a light source 104 which projects light rays up through a lens 106, the rays then impinging upon a mirrored surface 108 to turn the same at right angles, said mirrored surface being supported from the top of the cylindrical member 102. A transparent member 110 is supported in the side wall of the cylinder 102 and the rays projected from the mirror then proceed horizontally therethrough. These rays are carried across to a photosensitive surface 112 supported in a tube 114 on the cover 55. Thus the amount of light falling upon the photosensitive surface 112 will determine the flow of current therein which acts as an indexing control. The rotor 22 to be tested has at one angular position a small hole 116 therethrough, the rest of the web supporting portion being solid so that once each revolution a light flash is allowed to pass therethrough and cause current to flow through the photo tube 112. This impulse is also applied to the oscillograph.

Referring now more specifically to Figure 5, the output of the photo tube 112 is connected to control terminal 118 of a commercial oscillograph which is used with this balancing machine to indicate the amplitude and angular location of unbalance and upon which there is provided a scale 129 on a cathode ray tube thereof. The voltage supply for the tube 112 is provided through line 120 connected to a contact of double pole switch 124. The light source 104 is connected by line 121 to a second contact of the switch 124, one movable contact of the latter being connected by line 122 to the oscillograph and the opposite terminal of the lamp 104 is connected to ground, the opposite movable contact of said switch being connected by line 126 to the oscillograph. Each of the pick-up units 94 and 96 are connected to a single line 128 to the vertical deflecting circuit at terminal 130 of the oscillograph. Pick-up unit 94 is connected through line 132 to one terminal of a double throw switch 134 which is grounded and pick-up unit 96 is connected through line 136 to an opposite terminal of the double throw switch 134. These switches are physically shown in Figure 3 at 134 on the right hand lower portion of this figure and at 124 on the lower left hand portion.

In the operation of our device, switch 124 is first closed, which causes the lamp 104 to be illuminated and power supplied the photo cell and switch 134 is closed on one side to connect, for example, pick-up unit 94 to the vertical displacement circuit of the oscillograph. The button 80 is then pressed downward to open the bypass valve and cause the full air pressure to be applied to bring the rotor rapidly up to its rated speed. As soon as that is approached this button is released and the metering valve lever 78 pushed over to apply only the desired amount of air pressure to the nozzle. This then rotates the gyro-rotor at its rated speed. If there is any unbalance present the same will be transmitted from the end of the rotor through the nodal bar to pick-up unit 94 and the voltage generated thereby will cause vertical displacement of the wave appearing on the oscillograph, and the amount of the displacement or amplitude will be greater the greater the voltage generated. The switch 134 is then thrown to the other position and the amount of unbalance read which is caused by vibration of the opposite end of the rotor through the voltage generated in pick-up unit 96.

At the same time a pulse will be generated by the photo cell 112 due to light falling thereupon once per revolution and this has been connected into the oscillograph circuit to cause the horizontal sweep circuit to be triggered thereby and this pulse therefore initiates each horizontal deflection once per revolution. The peak of the vibration wave caused by vibration of either end of the rotor shaft will of course lie adjacent one line of the indexing lines 129 which are scaled from zero to 360 and the position of this peak is read directly from the head of the cathode ray tube. We now have an indication of the amount of unbalance and a figure as to its location angularly. The rotor is then stopped and turned by hand until the light passes through the opening to the photo cell. Then the plunger 52 is released to bring the protractor up into contact with the rotor surface. At this time the indexing mark on the protractor at zero will be in line with the casing. The rotor is then turned by hand until a number of degrees equal to that read on the vertical lines on the cathode ray tube is in line with the casing and at this point at which the light now falls upon the rotor will be the angular point of unbalance. Of course it may not be the same point of unbalance for each of the pick-up units 94 and 96 but in all probability the two will not be far apart angularly.

With this apparatus it is thus possible to quickly clamp in place a small rotatable part and bring it up to its rated speed, find the amount or amplitude of unbalance therein through the height of the wave on the oscillograph and then locate the angular position of this by allowing the protractor which is spring biased to zero position to roll on the surface of the rotor to an index number obtained from the scale on the oscillograph. This can be done very rapidly and the rotor may be balanced quickly through the use of our apparatus.

We claim:

1. In means for balancing a rotating part, means for resiliently supporting and rotating said part, means energized once during each revolution of the part to provide an index point, pick-up means energized by vibration of the supporting means, indicating means connected to both the cyclically energized means and the pick-up means and rotatable protractor means normally out of contact with the rotating part but capable of being brought into contact at a definitely predetermined point, said protractor being calibrated proportionately to the indicating means so that when the protractor and the part are engaged and rotated a point of vibration will be angularly located on the part as indicated by the indicating means without removing the part.

2. In means for balancing a rotating part, a resiliently mounted bearing means for rotatably supporting said part, vibration pick-up means contacting said bearing means, a light source mounted on one side of said part, a light sensitive means located on the opposite side of the part, said part having a small aperture in alignment with the light source and the light sensitive means whereby the light sensitive means is energized once per revolution of the part to provide an index, indicating means connected to the pick-up and light sensitive means and rotatable protractor means normally out of contact with the part but capable of being brought into contact therewith at an empirical point ascertained in conjunction with the light indexing means, said protractor being calibrated proportionately to the indicating means so that when the protractor and the part are engaged and rotated a point of vibration will be angularly located on the part as indicated by the indicating means without removing the part.

3. In means for balancing a rotating part, a resiliently mounted bearing means for rotatably supporting said part, vibration pick-up means contacting said bearing means, a light source mounted on one side of said part, a light sensitive means located on the opposite side of the part, the part having a small aperture in alignment with the light source and the light sensitive means whereby the light sensitive means is energized once per revolution of the part to provide an index, indicating means connected to both the vibration pick-up means and the light sensitive means, a rotatable protractor drum calibrated in proportion to the indicating means pivotally mounted adjacent the part and spring biased to zero position, said drum being normally out of contact with the part but being movable into contact therewith at an empirically predetermined point to transfer the reading of the indicating means to the part.

4. In means for balancing a rotating part having an index point, resiliently mounted supporting means for the part, means for driving the part, indexing means energized once per revolution of the part, pick-up means adjacent the supporting means energized by movement of the latter, an oscillograph having a scale on its tube connected to both the pick-up and indexing means whereby the point of maximum deflection or vibration may be located from the index point on the part and rotatable protractor means calibrated in proportion to the scale on the oscillograph mounted in juxtaposition to and applicable to the part at an empirically predetermined point to locate the point of maximum deflection on the part.

5. In means for balancing a rotating part having an index point, resiliently mounted supporting means for the part, means for driving the part, indexing means energized once per revolution of the part, pick-up means adjacent the supporting means energized by movement of the latter, an oscillograph having a scale on its tube connected to both the pick-up and indexing means whereby the point of maximum deflection or vibration may be located from the index point on the part, and a rotatable protractor drum calibrated in proportion to the scale on the oscillograph, spring biased to zero, pivotally mounted to engage the part at an empirically determined point and rotate therewith to locate the point of unbalance on the part in conjunction with the indexing means.

6. In means for balancing a rotating part, a main support, a bearing member on said support for rotatably carrying the part, a resiliently supported carriage capable of vertical movement on said support, and a drum indexed in arcuate degrees rotatably mounted on said carriage whose periphery in at least one position of its vertical movement will contact the periphery of the rotatable part for measuring arcuate distances on said part when rotated with said part.

7. In means for balancing a rotating part, a main support, a bearing member on said support for rotatably carrying the part, a resiliently supported carriage capable of vertical movement on said support, a drum indexed in arcuate degrees rotatably mounted on said carriage whose periphery in at least one position of its vertical movement will contact the periphery of the rotatable part for measuring arcuate distances on said part when the part and drum are rotated together, and locking means for retaining said carriage at one end of its travel.

8. In means for balancing a rotating part, a main support, a bearing member on said support for rotatably carrying the part, a resiliently supported carriage capable of vertical movement on said support, a drum rotatably mounted on said carriage having its axis parallel to the axis of the rotatable part and peripherally engageable with the part, and an indicia scale on the periphery of the drum for measuring circumferential distances when the part and drum are rotated while in engagement.

9. In means for balancing a rotating part, a main support, a bearing member on said support for rotatably carrying the part, a resiliently supported carriage capable of vertical movement on said support, a drum rotatably mounted on said carriage having its axis parallel to the axis of the rotatable part and peripherally engageable with the part, an indicia scale on the periphery of the drum for measuring circumferential distances when the part and drum are rotated while in engagement, and indexing means cooperating with the rotating part to indicate the point of initiation of the measuring of the periphery.

KAUNO E. SIHVONEN.
EARL F. RIOPELLE.